(12) United States Patent
Myojin

(10) Patent No.: US 11,218,059 B2
(45) Date of Patent: Jan. 4, 2022

(54) DUMMY PLATE AND METHOD FOR MANUFACTURING ARMATURE

(71) Applicant: MITSUI HIGH-TEC, INC., Kitakyushu (JP)

(72) Inventor: Iwao Myojin, Fukuoka (JP)

(73) Assignee: MITSUI HIGH-TEC, INC., Fukuoka (JP)

(*) Notice: Subject to any disclaimer, the term of this patent is extended or adjusted under 35 U.S.C. 154(b) by 298 days.

(21) Appl. No.: 15/848,667

(22) Filed: Dec. 20, 2017

(65) Prior Publication Data
US 2018/0183306 A1    Jun. 28, 2018

(30) Foreign Application Priority Data

Dec. 22, 2016 (JP) .............................. JP2016-248777

(51) Int. Cl.
*H02K 15/03* (2006.01)
*H02K 21/16* (2006.01)
*H02K 1/18* (2006.01)

(52) U.S. Cl.
CPC .............. *H02K 15/03* (2013.01); *H02K 1/18* (2013.01); *H02K 21/16* (2013.01)

(58) Field of Classification Search
CPC .......... H02K 15/03; H02K 1/18; H02K 21/24; H01F 41/0253; B29C 2033/0094;
(Continued)

(56) References Cited

U.S. PATENT DOCUMENTS 8,578,592 B2 *  11/2013  Nagai .................... H02K 1/276
                                                        29/598
2010/0026127 A1 *  2/2010  Mizutani .............. H02K 1/2766
                                                        310/156.53
(Continued)

FOREIGN PATENT DOCUMENTS

CN        103069698 A        4/2013
CN        103812284 A        5/2014
(Continued)

OTHER PUBLICATIONS

Ishimatsu, Hisatomo; English Translation of "Laminate iron core manufacturing method"; (2012); JP-2012223024-A (Year: 2012).*
(Continued)

*Primary Examiner* — Francisco W Tschen
*Assistant Examiner* — Edgaredmanuel Troche
(74) *Attorney, Agent, or Firm* — Greenblum & Bernstein, P.L.C.

(57) ABSTRACT

In a case where a permanent magnet is inserted into each of a plurality of magnet-insert holes of a laminated iron core and then a resin is injected into the plurality of magnet-insert holes from a resin pool pot formed in one of an upper die and a lower die with the laminated iron core pinched and the resin is cured inside the plurality of magnet-insert holes to fix the permanent magnets to the laminated iron core, a dummy plate which abuts on the laminated iron core and includes a gate hole for allowing passage of the resin delivered from the resin pool pot and guiding the resin to the plurality of magnet-insert holes. The gate hole partially overlaps with at least two of the plurality of magnet-insert holes in a plan view of the dummy plate and the laminated iron core.

16 Claims, 6 Drawing Sheets

(58) Field of Classification Search
CPC ............ B29C 33/0022; B29C 33/0088; B29C 33/301; B22D 19/0054; B23Q 7/00
USPC ...................................................... 264/328.1
See application file for complete search history.

(56) References Cited

U.S. PATENT DOCUMENTS

| | | | |
|---|---|---|---|
| 2013/0228280 A1* | 9/2013 | Hirayama | H02K 15/03 156/293 |
| 2013/0234363 A1 | 9/2013 | Nagai et al. | |
| 2014/0124978 A1 | 5/2014 | Mabu | |
| 2016/0352198 A1* | 12/2016 | Hirayama | H02K 15/03 |
| 2017/0117781 A1* | 4/2017 | Yoshida | H02K 15/03 |
| 2018/0204676 A1 | 7/2018 | Nagai et al. | |

FOREIGN PATENT DOCUMENTS

| | | |
|---|---|---|
| JP | 2002-209350 | 7/2002 |
| JP | 2010-110049 A | 5/2010 |
| JP | 2012-125029 | 6/2012 |
| JP | 2012223024 A * | 11/2012 |
| JP | 2015-2582 A | 1/2015 |
| JP | 2016-116374 | 6/2016 |

OTHER PUBLICATIONS

China Official Action received in China Application No. 201711405185.4, dated Jun. 29, 2020.
Office Action dated Jun. 2, 2020 in the corresponding Japanese patent application No. 2016-248777 and English translation thereof.

* cited by examiner

DUMMY PLATE AND METHOD FOR MANUFACTURING ARMATURE

CROSS REFERENCE TO RELATED APPLICATION

This application is based upon and claims the benefit of priority of Japanese Patent Application No. 2016-248777 filed on Dec. 22, 2016, the contents of which are incorporated herein by reference in its entirety.

BACKGROUND OF THE INVENTION

1. Field of the Invention

The present invention relates to a dummy plate used in manufacture of an armature, and a method for manufacturing the armature using the dummy plate.

2. Description of the Related Art

In a case of manufacturing an armature with permanent magnets, it is known that the permanent magnets are inserted into magnet-insert holes formed in a laminated iron core and then a resin is injected into the magnet-insert holes and the resin is cured to fix the permanent magnets to the laminated iron core.

For example, JP-A-2016-116374 named Patent Literature 1 discloses a method for manufacturing an armature with permanent magnets, the method in which a dummy plate is placed on an upper surface of a laminated iron core and the dummy plate and the laminated iron core are pinched by an upper die and a lower die and a resin is injected into the laminated iron core from the upper die. The upper die used in the method is formed with a resin pool pot, and a plunger is included in the resin pool pot. The dummy plate is formed with a gate hole, and when the plunger included in the resin pool pot is operated, a resin stored in the resin pool pot flows into magnet-insert holes through the gate hole.

A resin injection apparatus described in JP-A-2012-125029 named Patent Literature 2 includes a plunger and a resin pool pot in a lower die, and a dummy plate is arranged so as to abut on a lower surface of a laminated iron core. A resin stored in the resin pool pot is injected into magnet-insert holes from the lower surface of the laminated iron core through a gate hole formed in the dummy plate (Patent Literature 2, FIG. 11).

The dummy plate is a metal plate used for facilitating removal of a resin residue remaining after injection and curing of a resin. When the dummy plate is absent, the resin overflowing from a magnet-insert hole in the case of injecting the resin into the magnet-insert hole is cured on an end face of a laminated iron core to form a resin residue, and the resin residue adheres to the laminated iron core. Since removal of the resin residue requires time and effort, manufacture of an armature with permanent magnets is inhibited. On the other hand, when the dummy plate is arranged between a die and the laminated iron core, a resin residue is formed on a surface of the dummy plate. Then, by detaching the dummy plate, an armature with permanent magnets, to which the resin residue does not adhere, can be delivered to the next step. That is, the resin residue can be removed by only detaching the dummy plate. In addition, the dummy plate is called a cull plate.

Also, in an armature with permanent magnets, the permanent magnets with the same number as poles of the armature are generally arranged at equal distances in a circumferential direction. However, in recent years, a plurality of permanent magnets are arranged in one pole of the armature in order to improve electromagnetic performance of the armature (JP-A-2002-209350 named Patent Literature 3). That is, in recent years, the number of permanent magnets included by the armature with permanent magnets tends to be increased.

Patent Literature 1: JP-A-2016-116374
Patent Literature 2: JP-A-2012-125029
Patent Literature 3: JP-A-2002-209350

SUMMARY OF THE INVENTION

When the armature with permanent magnets including the many permanent magnets as described in Patent Literature 3 is manufactured by an apparatus described in Patent Literature 1 or 2, it is necessary to provide a dummy plate with gate holes with the same number as magnet-insert holes included by a laminated iron core so that a resin can simultaneously be injected into the many magnet-insert holes. That is, it is necessary to increase the number of gate holes. Also, when the number of gate holes is increased, it is also necessary to increase the number of flow paths called runners for communicating the gate holes to a resin pool pot.

Even after injection of the resin is completed, a part of the resin injected into the magnet-insert holes from the resin pool pot remains inside the gate holes and the runners, and a resin residue occurs. As a result, when the number of gate holes and the number of runners are increased, the amount of the resin residue is increased. When the amount of the resin residue is increased, a problem of increasing an effort to remove the resin residue from the dummy plate arises. Also, the amount of the resin discarded as the resin residue is increased, with the result that a problem of increasing a material cost arises.

The present invention has been implemented in view of such circumstances, and a non-limited object of the present invention is to provide a dummy plate used in a case of filling magnet-insert holes formed in a laminated iron core with a resin and fixing permanent magnets to the laminated iron core, the dummy plate having a small amount of occurrence of a resin residue. Also, another non-limited object of the present invention is to provide a method for manufacturing an armature with permanent magnets, the method having a small amount of occurrence of the resin residue.

There is provided, according to an aspect of the present invention, a dummy plate used in a case where a permanent magnet is inserted into each of a plurality of magnet-insert holes formed in a laminated iron core and then a resin is injected into the plurality of magnet-insert holes from a resin pool pot formed in one of an upper die and a lower die with the laminated iron core pinched by the upper die and the lower die and the resin is cured inside the plurality of magnet-insert holes to fix the permanent magnets to the laminated iron core, the dummy plate which abuts on an end face of the laminated iron core and includes a gate hole for allowing passage of the resin delivered from the resin pool pot and guiding the resin to the plurality of magnet-insert holes, wherein the gate hole is arranged so as to partially overlap with at least two of the plurality of magnet-insert holes in a plan view of the dummy plate and the laminated iron core.

The gate hole may be arranged so that a center of the gate hole is placed on a line segment connecting two magnet-insert holes at a shortest distance in the plan view of the dummy plate and the laminated iron core.

The gate hole may be arranged so that the center of the gate hole is placed at a middle point of the line segment.

The center of the gate hole may be arranged in a position near to the magnet-insert hole with a larger capacity of the injected resin beyond a middle point of the line segment when capacities of the resins injected into the two magnet-insert holes differ.

There is also provided, according to another aspect of the present invention, a dummy plate to be used for manufacturing an armature, the dummy plate including: a metallic body; and a gate hole formed through the metallic body for allowing passage of resin delivered from a resin pool pot and guiding the resin to a plurality of magnet-insert holes of a laminated iron core, wherein the gate hole is designed to partially overlap with at least two of the plurality of magnet-insert holes in a plan view of the dummy plate and the laminated iron core.

There is also provided, according to a still another aspect of the present invention, a method for manufacturing an armature, including: inserting a permanent magnet into each of a plurality of magnet-insert holes formed in a laminated iron core; placing a dummy plate on an end face of the laminated iron core, wherein the dummy plate includes a metallic body, and a gate hole formed through the metallic body, while aligning the gate hole to partially overlap with at least two of the plurality of magnet-insert holes in a plan view of the dummy plate and the laminated iron core; pinching the laminated iron core and the dummy plate by an upper die and a lower die, either of which includes a resin pool pot; injecting a resin into the plurality of magnet-insert holes from the resin pool pot through the gate hole of the dummy plate; and curing the resin inside the plurality of magnet-insert holes to fix the permanent magnets to the laminated iron core.

Since the gate hole formed in the dummy plate according to the aspects of the present invention is arranged so as to partly overlap with at least two of the plurality of magnet-insert holes in a plan view of the dummy plate and the laminated iron core, the number of gate holes included by the dummy plate can be decreased. Also, the number of runners arranged between the resin pool pot and the gate hole can be decreased. In the method for manufacturing the armature according to the aspect of the present invention, the resin is injected into the magnet-insert holes using such a dummy plate, with the result that the amount of a resin residue remaining in the dummy plate can be decreased, and an effort to remove the resin residue can be decreased and also, the amount of the resin discarded can be decreased.

BRIEF DESCRIPTION OF THE DRAWINGS

In the accompanying drawings:

FIGS. 6A to 6F show steps of manufacturing the armature in time series.

DETAILED DESCRIPTION OF THE EXEMPLARY EMBODIMENTS

Figure 1:
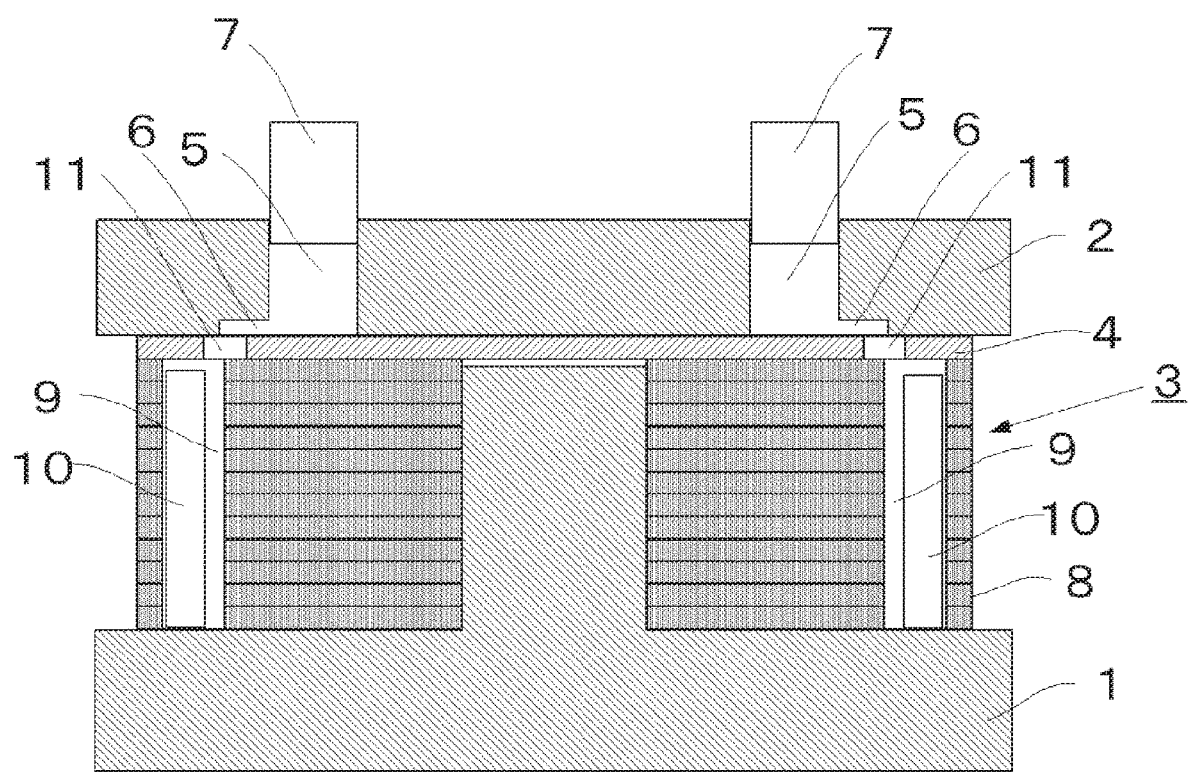
FIG. 1 is a sectional view showing a dummy plate and a laminated iron core according to an embodiment of the invention being pinched by an upper die and a lower die.

FIG. 1 is a sectional view showing a laminated iron core 3 and a dummy plate 4 according to an embodiment of the present invention being pinched by a lower die 1 and an upper die 2. The lower die 1, the upper die 2, the laminated iron core 3 and the dummy plate 4 are attached to a resin injection apparatus (not shown).

The lower die 1 is a die which is arranged under the laminated iron core 3 in FIG. 1 and holds the laminated iron core 3. The upper die 2 is a die arranged over the laminated iron core 3. The lower die 1 and the upper die 2 pinch the laminated iron core 3, and press the laminated iron core 3. Also, the upper die 2 is formed with a resin pool pot 5 and a runner 6, and a plunger 7 is retractably attached to the resin pool pot 5. The resin pool pot 5 is a cylindrical void vertically pierced in the upper die 2, and is a region in which a resin supplied from the resin injection apparatus (not shown) is temporarily stored. The runner 6 is a groove formed in a lower surface of the upper die 2, that is, a surface abutting on the dummy plate 4, and is connected to the resin pool pot 5. Also, the plunger 7 is a kind of piston. As a result, when the plunger 7 is depressed, the resin stored in the resin pool pot 5 is extruded from the resin pool pot 5, and flows into the runner 6.

The laminated iron core 3 is a component constructing an armature with permanent magnets, and is constructed by laminating a plurality of iron core pieces 8. The laminated iron core 3 is formed with a plurality of magnet-insert holes 9 pierced in the laminated iron core 3 in a vertical direction in FIG. 1. A permanent magnet 10 is inserted into the magnet-insert hole 9. In addition, the magnet-insert hole 9 is formed by blanking a material in manufacturing the iron core piece 8.

The dummy plate 4 is a metal plate, having a metallic body with the same shape and the same dimensions as those of the laminated iron core 3 in a plan view, and is arranged between the upper die 2 and the laminated iron core 3. That is, the dummy plate 4 is constructed so as to abut on an upper surface of the laminated iron core 3 and cover the whole upper surface of the laminated iron core 3. The dummy plate 4 is formed with a gate hole 11. The gate hole 11 is a hole vertically pierced in the dummy plate 4, and is arranged in a position in which the runner 6 formed in the upper die 2 is communicated to the magnet-insert hole 9 formed in the laminated iron core 3 in the state shown in FIG. 1.

Since the lower die 1, the upper die 2, the laminated iron core 3 and the dummy plate 4 are constructed as described above, when the resin injection apparatus (not shown) is operated to depress the plunger 7, the resin stored in the resin pool pot 5 flows into the magnet-insert hole 9 through the runner 6 and the gate hole 11. Curing the resin flowing into the magnet-insert hole 9 fixes the permanent magnet 10 to the laminated iron core 3.

Figure 2A:
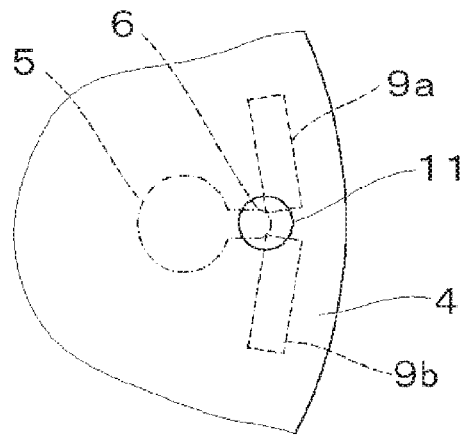
FIGS. 2A to 2C are plan views showing a relative position of a gate hole included by the dummy plate described in FIG. 1 with respect to a resin pool pot formed in the upper die and magnet-insert holes formed in the laminated iron core, and FIGS. 2A to 2C respectively show modified examples.
Figure 2B:
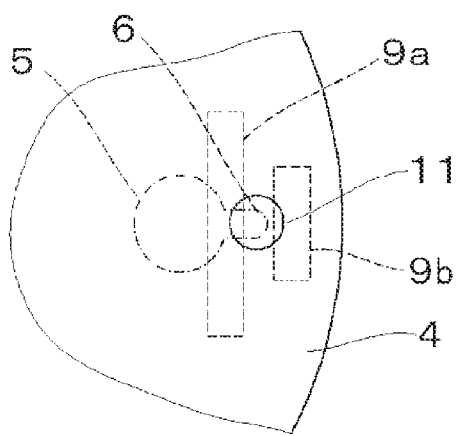
Figure 2C:
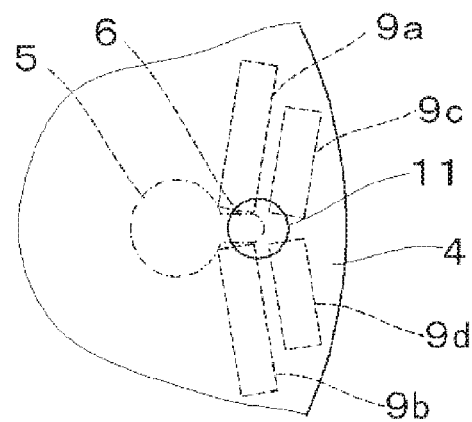

FIGS. 2A to 2C are plan views showing a relative position of the gate hole 11 formed in the dummy plate 4 according to the present embodiment, the resin pool pot 5 and the runner 6 included by the upper die 2, and the magnet-insert holes 9 formed in the laminated iron core 3. FIG. 2A shows an example in which the gate hole 11 is arranged so as to inject a resin into two magnet-insert holes 9a, 9b from one gate hole 11 when the magnet-insert hole 9a and the magnet-insert hole 9b are circumferentially disposed in the laminated iron core 3 and both of the holes are placed so as to form a nearly V shape in a separate manner. As shown in FIG. 2A, the gate hole 11 is in a region in which the magnet-insert hole 9a is nearest to the magnet-insert hole 9b in a plan view, and is arranged so that a part of the gate hole 11 overlaps with a part of each of the magnet-insert hole 9a and the magnet-insert hole 9b in plan view. Also, the runner 6 is arranged between the resin pool pot 5 and the gate hole 11, and the runner 6 communicates the resin pool pot 5 to the gate hole 11. As a result, the resin stored in the resin pool pot 5 flows into the gate hole 11 through the runner 6. The resin flowing into the gate hole 11 flows into the magnet-insert holes 9a, 9b through the portion in which the magnet-insert holes 9a, 9b overlap with the gate hole 11 in the plan view.

FIG. 2B shows an arrangement example of the gate hole 11 when a magnet-insert hole 9a and a magnet-insert hole 9b are radially disposed in the laminated iron core 3 and both of the holes are placed in parallel. As shown in FIG. 2B, the gate hole 11 is in a region of the middle between the magnet-insert hole 9a and the magnet-insert hole 9b, and is arranged so that a part of the gate hole 11 overlaps with a part of each of the magnet-insert holes 9a, 9b in a plan view. As a result, the resin flowing into the gate hole 11 from the resin pool pot 5 through the runner 6 flows into the magnet-insert holes 9a, 9b through the portion in which the magnet-insert holes 9a, 9b overlap with the gate hole 11 in the plan view.

FIG. 2C shows an arrangement example of the gate hole 11 when four magnet-insert holes 9a, 9b, 9c, 9d are formed in the laminated iron core 3. As shown in FIG. 2C, the magnet-insert holes 9a, 9b are circumferentially disposed and both of the holes are placed so as to form a nearly V shape in a separate manner. The magnet-insert hole 9c, 9d are also circumferentially disposed and both of the holes are placed so as to form a nearly V shape in a separate manner. A set of the magnet-insert holes 9a, 9b and a set of the magnet-insert holes 9c, 9d are radially spaced in parallel. The gate hole 11 is in a region surrounded by the magnet-insert holes 9a, 9b, 9c, 9d, and is arranged so that a part of the the gate hole 11 overlaps with a part of each of the magnet-insert holes 9a, 9b, 9c, 9d in a plan view. As a result, the resin flowing into the gate hole 11 from the resin pool pot 5 through the runner 6 flows into all of the magnet-insert holes 9a, 9b, 9c, 9d through the portion overlapping with each of the magnet-insert holes 9a, 9b, 9c, 9d of the gate hole 11 in the plan view.

As shown in FIGS. 2A to 2C, the gate hole 11 included by the dummy plate 4 is arranged so as to partially overlap with at least two of the plurality of magnet-insert holes 9a to 9d when the laminated iron core 3 is covered with the dummy plate 4 and the dummy plate 4 is viewed in a plane. As a result, the resin can be injected into the plural magnet-insert holes 9a to 9d from the one gate hole 11.

Figure 3A:
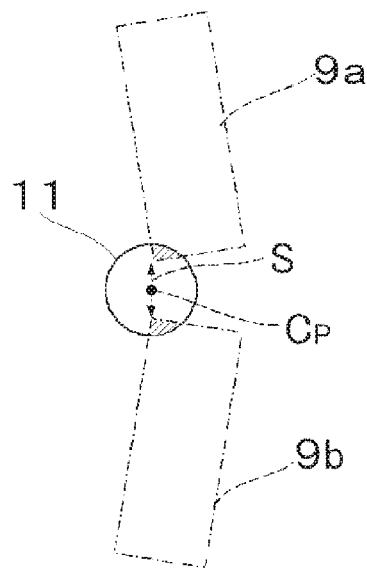
FIGS. 3A to 3D are plan views showing a relative position of the gate hole included by the dummy plate described in FIG. 1 with respect to two adjacent magnet-insert holes formed in the laminated iron core, and FIGS. 3A to 3D respectively show modified examples.
Figure 3B:
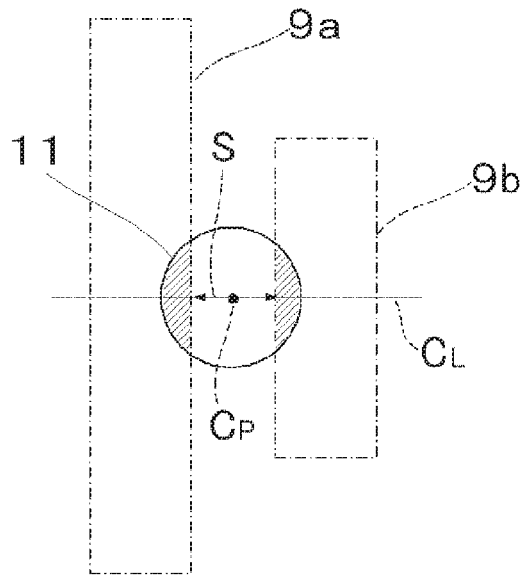
Figure 3C:
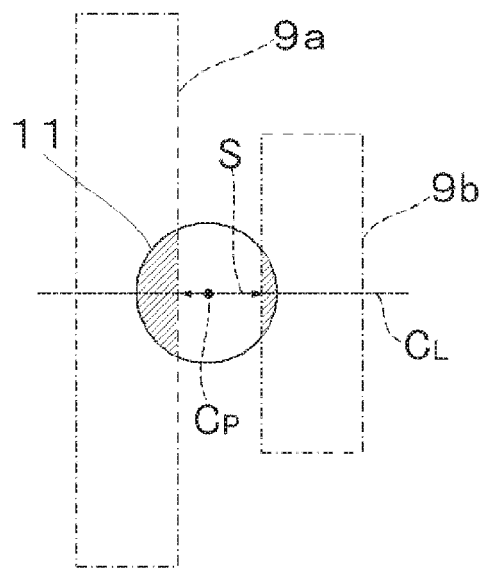
Figure 3D:
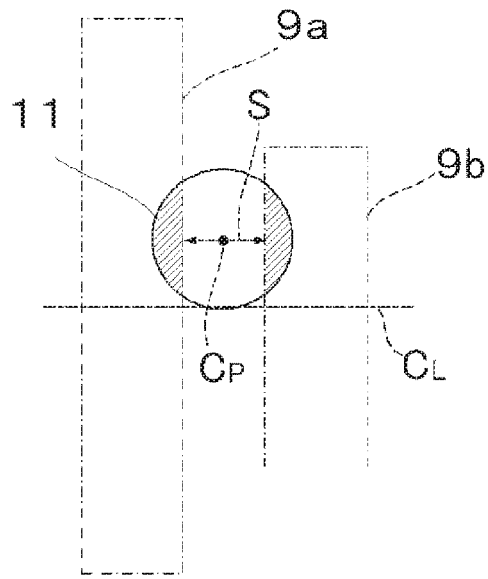

Next, a relative position of the gate hole 11 with respect to the magnet-insert holes 9 will be described in detail with reference to FIGS. 3A to 3D. FIG. 3A shows the case where a magnet-insert hole 9a and a magnet-insert hole 9b are circumferentially disposed and both of the holes are placed so as to form a nearly V shape. That is, FIG. 3A specifically shows a relative position of the gate hole 11 with respect to the magnet-insert holes 9 in the dummy plate 4 shown in FIG. 2A. FIGS. 3B to 3D show the case where a magnet-insert hole 9a and a magnet-insert hole 9b are radially disposed and both of the holes are placed in parallel. That is, FIGS. 3B to 3D specifically show relative positions of the gate holes 11 with respect to the magnet-insert holes 9 in the dummy plate 4 shown in FIG. 2B. Also, in FIGS. 3A to 3D, the portions (hatched regions) of overlap between the magnet-insert holes 9a, 9b and the gate hole 11 in a plan view correspond to cross-sectional areas of inlets in which the resin is injected into the magnet-insert hole 9a and the magnet-insert hole 9b, respectively.

In the case of FIG. 3A, the gate hole 11 is arranged so that the center $C_P$ of the gate hole 11 is placed at a middle point of a line segment S connecting the magnet-insert hole 9a to the magnet-insert hole 9b at the shortest distance. By arranging the gate hole 11 in this manner, the diameter of the gate hole 11 can be minimized while ensuring the cross-sectional areas of the inlets necessary to properly inject the resin into the magnet-insert hole 9a and the magnet-insert hole 9b. As a result, the amount of the resin remaining in the gate hole 11 after the gate hole 11 is filled with the resin is minimized. Also, the areas of the portions (hatched regions) of overlap between the magnet-insert holes 9a, 9b and the gate hole 11 in the plan view can be equalized. Because of that, inflow speeds of the resin flowing into the magnet-insert hole 9a and the magnet-insert hole 9b become equal. As a result, filling of the magnet-insert hole 9a with the resin and filling of the magnet-insert hole 9b with the resin are completed at the same timing.

In the case of FIG. 3B, the gate hole 11 is arranged so that the center $C_P$ of the gate hole 11 is on a center line $C_L$ of the magnet-insert hole 9a and the magnet-insert hole 9b and is placed at a middle point of a line segment S connecting the magnet-insert hole 9a to the magnet-insert hole 9b at the shortest distance. In addition, the center line $C_L$ is a straight line for dividing the magnet-insert hole 9a and the magnet-insert hole 9b in half in the plan view. Also in this case, since the center $C_P$ of the gate hole 11 is placed at the middle point of the line segment S, the diameter of the gate hole 11 can be minimized, and the amount of the resin remaining in the gate hole 11 after the gate hole 11 is filled with the resin is minimized. Also, since the portions (hatched regions) of overlap between the magnet-insert holes 9a, 9b and the gate hole 11 in the plan view are arranged on the center line $C_L$, the resin flows inside the magnet-insert hole 9a and the magnet-insert hole 9b without bias.

As shown in FIG. 3C, when the magnet-insert hole 9a is larger than the magnet-insert hole 9b in a plan view, that is, when a capacity of the magnet-insert hole 9a is larger than a capacity of the magnet-insert hole 9b, the center $C_P$ of the gate hole 11 may be placed in a position near to the magnet-insert hole 9a beyond a middle point of a line segment S. By arranging the gate hole 11 in this manner, the area of the portion (hatched regions) of overlap between the magnet-insert hole 9a and the gate hole 11 in the plan view becomes larger than the area of the portions (hatched regions) of overlap between the magnet-insert hole 9b and the gate hole 11 in the plan view. Because of that, an inflow speed of the resin flowing into the magnet-insert hole 9a becomes higher than an inflow speed of the resin flowing into the magnet-insert hole 9b. As a result, filling of the magnet-insert hole 9*a* with the resin and filling of the magnet-insert hole 9*b* with the resin are completed at the same timing, FIGS. 3B and 3C show the example in which the gate hole 11 is arranged so that the center $C_P$ of the gate hole 11 is placed on the center line $C_L$ of the magnet-insert hole 9*a* and the magnet-insert hole 9*b* but the line segment S connecting the magnet-insert hole 9*a* to the magnet-insert hole 9*b* at the shortest distance is also present in a place offset from the center line $C_L$. As shown in FIG. 3D, the center $C_P$ of the gate hole 11 may be placed on a line segment S in a position offset from the center line $C_L$.

Figure 4:
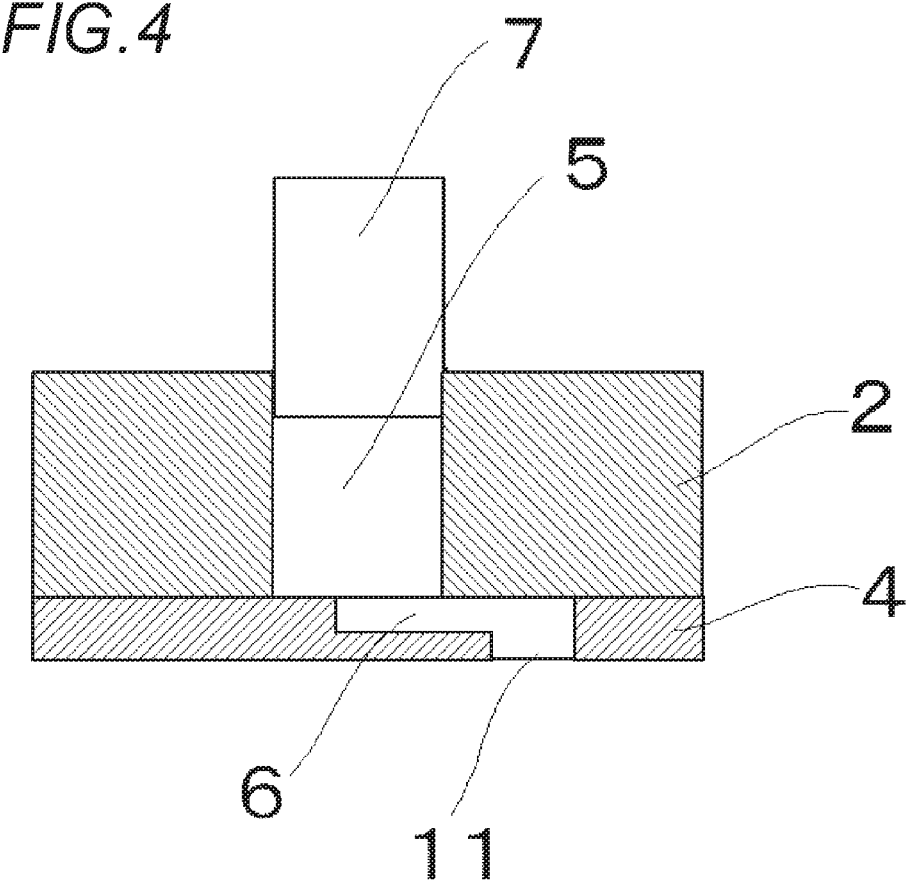
FIG. 4 is a sectional view showing a modified example of a relative position of the gate hole included by the dummy plate described in FIG. 1 with respect to the resin pool pot formed in the upper die.
Figure 5A:
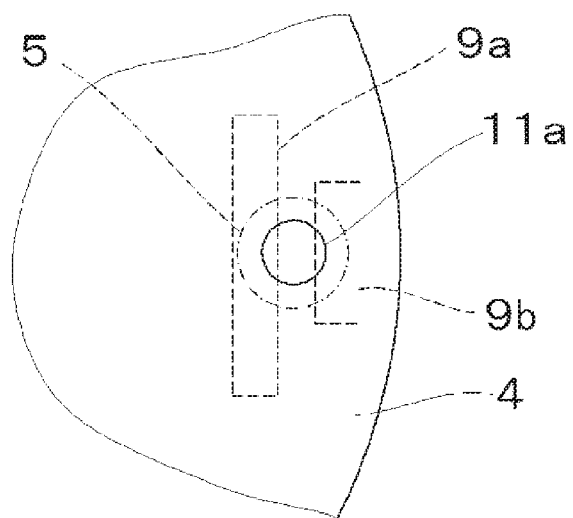
FIGS. 5A and 5B are plan views of the dummy plate showing modified examples of a relative position of the gate hole included by the dummy plate described in FIG. 1 with respect to the resin pool pot formed in the upper die, and FIGS. 5A and 5B respectively show different modified examples.
Figure 5B:
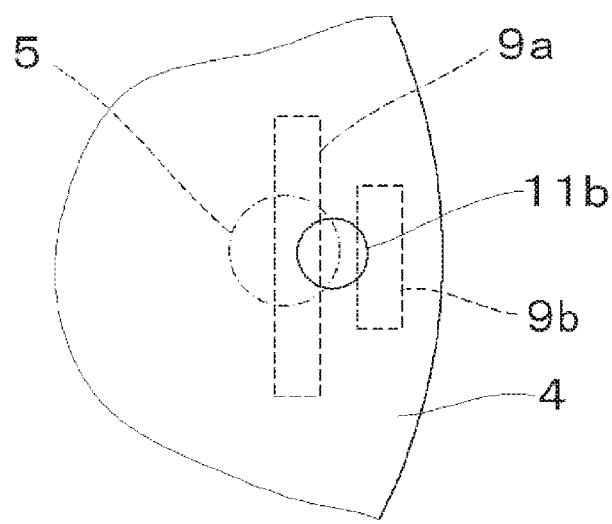

The runner 6 is not limited to the runner formed in the upper die 2 as shown in FIG. 1. As shown in FIG. 4, the runner 6 may be formed in the dummy plate 4. Also, when the whole gate hole 11*a* is positioned just under the resin pool pot 5 as shown in FIG. 5A, or when a part of a gate hole 11*b* is positioned just under the resin pool pot 5 as shown in FIG. 5B, a resin can be directly injected into each of the gate holes 11*a*, 11*b* from the resin pool pot 5. In this case, since it is unnecessary to form the runner 6 between the resin pool pot 5 and each of the gate holes 11*a*, 11*b*, a resin residue remaining in the dummy plate 4 is decreased. As a result, an effort to remove the resin residue and the amount of the resin discarded can be decreased further.

Figure 6A:
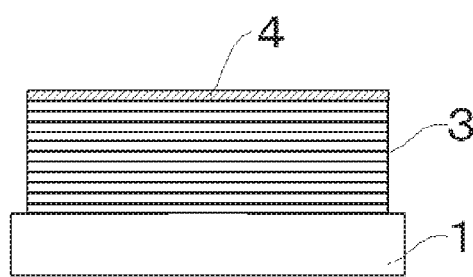
FIGS. 6A to 6F show a method for manufacturing an armature according to an embodiment of the present invention.
Figure 6D:
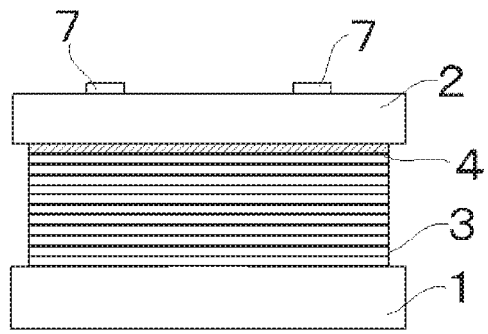
Figure 6B:
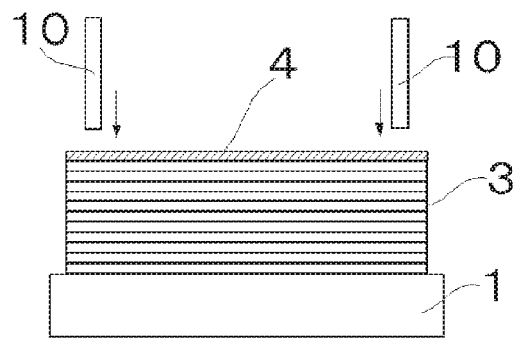

Finally a method for manufacturing an armature using the dummy plate 4 will be described. First, as shown in FIG. 6A, the laminated iron core 3 is placed on the lower die 1, and the laminated iron core 3 is covered with the dummy plate 4. Next, as shown in FIG. 6B, the permanent magnets 10 are inserted into the magnet-insert holes 9 (not shown in FIG. 6). Then, as shown in FIG. 6C, the upper die 2 is placed on the dummy plate 4, and is attached to a resin injection apparatus (not shown). Then, as shown in FIG. 6D), the plunger 7 is depressed by the resin injection apparatus, and a resin is injected into the magnet-insert holes 9. In addition, a concrete configuration of the resin injection apparatus refers to Patent Literature 2 (FIG. 1 etc.) when necessary.

Figure 6E:
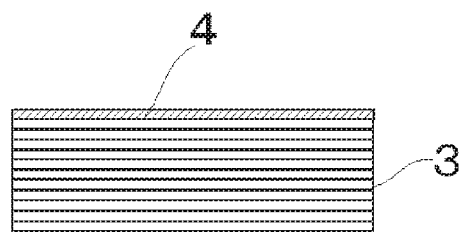
Figure 6C:
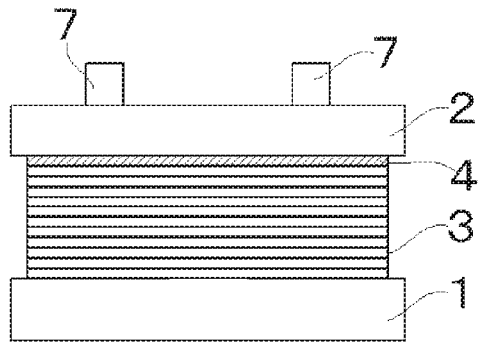
Figure 6F:
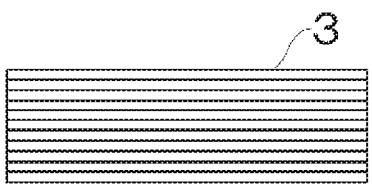

After the resin injected into the magnet-insert holes 9 is cured, as shown in FIG. 6E, the upper die 2 and the lower die 1 are detached from the laminated iron core 3 and the dummy plate 4. Finally, as shown in FIG. 6F, the dummy plate 4 is detached from the laminated iron core 3. At this time, together with the dummy plate 4, a resin residue adhering to the dummy plate 4 is removed from the laminated iron core 3. The armature with the permanent magnets is completed through the above process.

As described above, the gate hole 11 included by the dummy plate 4 according to the embodiment is arranged so as to partially overlap with at least two of the plurality of magnet-insert holes 9 in the plan view when the laminated iron core 3 is covered with the dummy plate 4. That is, the plurality of magnet-insert holes 9 share the one gate hole 11. Because of that, the resin can be injected into the many magnet-insert holes 9 by the few gate holes 11. As a result, the dummy plate 4 according to the embodiment can decrease the number of gate holes 11 as compared with a conventional product. Also, in the case of using the dummy plate 4 according to the embodiment, the number of runners 6 arranged between the resin pool pot 5 and the gate hole 11 can be decreased in the upper die 2 or the dummy plate 4. Because of that, the amount of the resin residue remaining after the magnet-insert holes 9 are filled with the resin is decreased. As a result, an effort to remove the resin residue can be decreased. Also, since the amount of the resin discarded as the resin residue is decreased, a yield rate of a resin material is improved.

Of course, the technical scope of the present invention is not limited to the description of the embodiment. The present invention can be freely applied, modified or improved within the technical idea described in the claims.

For example, the embodiment shows the example in which the upper die 2 includes the resin pool pot 5 and the dummy plate 4 including the gate hole 11 is arranged so as to abut on the upper surface of the laminated iron core 3, but the dummy plate 4 is not limited to such an example. The lower die 1 may include the resin pool pot 5 and the dummy plate 4 may be arranged so as to abut on a lower surface of the laminated iron core 3. That is, a resin extruded from the resin pool pot 5 included by the lower die 1 may be injected into the magnet-insert holes 9 from the lower surface of the laminated iron core 3 through the gate hole 11 formed in the dummy plate 4 abutting on the lower surface of the laminated iron core 3.

Also, when the lower die 1 includes the resin pool pot 5 and the dummy plate 4 is arranged so as to abut on the lower surface of the laminated iron core 3, like a resin filling apparatus described in FIG. 11 of Patent Literature 2, a conveyance jig (conveyance jig 2) may be arranged between the lower die 1 (lower die 12) and the dummy plate 4 (lower surface dummy plate 28).

Also, when the conveyance jig is arranged between the lower die 1 and the laminated iron core 3, like a resin filling apparatus described in FIG. 10 of Patent Literature 3, the dummy plate 4 (lower surface dummy plate 28) may be omitted and the conveyance jig (conveyance jig 2) may function as the dummy plate 4. That is, when an opening (opening 16) included by the conveyance jig (conveyance jig 2) constructing the resin filling apparatus described in FIG. 10 of Patent Literature 3 is arranged so as to partially overlap with each of the plurality of magnet-insert holes (magnet-insert holes 5) in the plan view, the opening (opening 16) functions as the gate hole 11 according to the example of the present invention, and the conveyance jig (conveyance jig 2) functions as the dummy plate 4 according to the example of the present invention. That is, in this case, the conveyance jig (conveyance jig 2) corresponds to the dummy plate 4 according to the example of the present invention.

The embodiment shows the example in which the plane shape (horizontal cross-sectional shape) of the gate hole 11 is a circular shape, but the plane shape of the gate hole 11 is not limited to the circular shape. The plane shape of the gate hole 11 may be an elliptic shape, a rectangular shape or other shapes.

The magnet-insert holes 9 in the laminated iron core 3 shown in the embodiment are illustrative. The laminated iron core 3 to which the present invention is applied is not limited to the laminated iron core shown in the embodiment. A shape, arrangement and the number of magnet-insert holes 9 included by the laminated iron core 3 are freely selected. That is, the present invention can be applied to any case where the shape, arrangement and the number of magnet-insert holes 9 included by the laminated iron core 3 are freely selected.

The shape, arrangement and the number of resin pool pots 5 shown in the embodiment are illustrative. The upper die 2 and the lower die 1 used for performing the method according to the invention can be freely designed.

The resin pool pot 5 and the gate hole 11 are not limited to a one-to-one combination. It may be constructed so that one resin pool pot 5 is combined with a plurality of gate holes 11 and a resin flows from one resin pool pot 5 to the plurality of gate holes 11.

Use of the armature with permanent magnets manufactured by the method according to the present invention is not limited. The armature with permanent magnets may be an armature constructing an electric motor, or an armature constructing a power generator. The armature with permanent magnets may be a stator or a rotor.

The reference numerals/signs with the constituent elements used in describing the embodiment of the present disclosure are listed as below.

1: LOWER DIE
2: UPPER DIE
3: LAMINATED IRON CORE
4: DUMMY PLATE
5: RESIN POOL POT
6: RUNNER
7: PLUNGER
8: IRON CORE PIECE
9 (9a to 9d): MAGNET-INSERT HOLE
10: PERMANENT MAGNET
11 (11a, 11b): GATE HOLE

What is claimed is:

1. A dummy plate, used in a case where a permanent magnet is inserted into each of a plurality of magnet-insert holes formed in a laminated iron core and then a resin is injected into the plurality of magnet-insert holes from a resin pool pot formed in one of an upper die and a lower die with the laminated iron core pinched by the upper die and the lower die and the resin is cured inside the plurality of magnet-insert holes to fix the permanent magnets to the laminated iron core, the dummy plate comprising:
    a generally planar body that abuts an end face of the laminated iron core, the generally planar body having a gate hole for allowing passage of the resin delivered from the resin pool pot and guiding the resin to the plurality of magnet-insert holes, the plurality of magnet-insert holes including at least two magnet-insert holes arranged side by side in a radial direction of the laminated iron core,
    wherein the gate hole is arranged so as to partially overlap with the at least two magnet-insert holes in a plan view of the dummy plate and the laminated iron core, and
    wherein the gate hole is arranged so that a center of the gate hole is placed on a line segment connecting the at least two magnet-insert holes at a shortest distance in the plan view of the dummy plate and the laminated iron core.

2. The dummy plate according to claim 1, wherein the gate hole is arranged so that the center of the gate hole is placed at a middle point of the line segment.

3. The dummy plate according to claim 1, wherein the center of the gate hole is arranged in a position near to the magnet-insert hole with a larger capacity of the injected resin beyond a middle point of the line segment when capacities of the resins injected into the two magnet-insert holes differ.

4. The dummy plate according to claim 1, wherein the center of the gate hole is on a center line of the at least two magnet-insert holes.

5. A dummy plate to be used for manufacturing an armature, the dummy plate comprising:
    a metallic body; and
    a gate hole formed through the metallic body for allowing passage of resin delivered from a resin pool pot and guiding the resin to a plurality of magnet-insert holes of a laminated iron core, the plurality of magnet-insert holes including at least two magnet-insert holes arranged side by side in a radial direction of the laminated iron core, wherein the gate hole is designed to partially overlap with the at least two magnet-insert holes in a plan view of the dummy plate and the laminated iron core, and
    wherein the gate hole has a center placed on a line segment connecting the at least two magnet-insert holes at a shortest distance in the plan view of the dummy plate and the laminated iron core.

6. The dummy plate according to claim 5, wherein the center of the gate hole is placed at a middle point of the line segment.

7. The dummy plate according to claim 5, wherein the center of the gate hole is arranged in a position near to the magnet-insert hole with a larger capacity of the injected resin beyond a middle point of the line segment.

8. The dummy plate according to claim 5, wherein the center of the gate hole is on a center line of the at least two magnet-insert holes.

9. A method for manufacturing an armature, comprising:
    inserting a permanent magnet into each of a plurality of magnet-insert holes formed in a laminated iron core, the plurality of magnet-insert holes including at least two magnet-insert holes arranged side by side in a radial direction of the laminated iron core;
    placing a dummy plate on an end face of the laminated iron core, wherein the dummy plate includes a metallic body, and a gate hole formed through the metallic body, while aligning the gate hole to partially overlap with the at least two magnet-insert holes in a plan view of the dummy plate and the laminated iron core;
    pinching the laminated iron core and the dummy plate by an upper die and a lower die, either of which includes a resin pool pot;
    injecting a resin into the plurality of magnet-insert holes from the resin pool pot through the gate hole of the dummy plate; and
    curing the resin inside the plurality of magnet-insert holes to fix the permanent magnets to the laminated iron core, and
    placing a center of the gate hole on a line segment connecting the at least two magnet-insert holes at a shortest distance in the plan view of the dummy plate and the laminated iron core.

10. The manufacturing method according to claim 9, wherein the center of the gate hole is placed at a middle point of the line segment.

11. The manufacturing method according to claim 9, wherein the center of the gate hole is placed in a position near to the magnet-insert hole with a larger capacity of the injected resin beyond a middle point of the line segment when capacities of the resins injected into the two magnet-insert holes differ.

12. The manufacturing method according to claim 9, wherein the center of the gate hole is on a center line of the at least two magnet-insert holes.

13. A dummy plate and laminated iron core assembly, comprising:
    a laminated iron core having a permanent magnet inserted into each of a plurality of magnet-insert holes formed in the laminated iron core and a resin injected into the plurality of magnet-insert holes from a resin pool pot formed in one of an upper die and a lower die with the laminated iron core pinched by the upper die and the lower die and the resin being cured inside the plurality of magnet-insert holes, thereby fixing the permanent magnets to the laminated iron core, the plurality of magnet-insert holes including at least two magnet-insert holes arranged side by side in a radial direction of the laminated iron core;

a dummy plate which abuts on an end face of the laminated iron core, the dummy plate having a gate hole for allowing passage of the resin delivered from the resin pool pot and guiding the resin to the plurality of magnet-insert holes, wherein the gate hole is arranged so as to partially overlap with the at least two magnet-insert holes in a plan view of the dummy plate and the laminated iron core, and the gate hole is arranged so that a center of the gate hole is placed on a line segment connecting the at least two magnet-insert holes at a shortest distance in the plan view of the dummy plate and the laminated iron core.

14. The dummy plate and laminated iron core assembly according to claim 13, wherein the center of the gate hole is placed at a middle point of the line segment.

15. The dummy plate and laminated iron core assembly to claim 13, wherein the center of the gate hole is arranged in a position near to the magnet-insert hole with a larger capacity of the injected resin beyond a middle point of the line segment.

16. The dummy plate and laminated iron core assembly according to claim 13, wherein the center of the gate hole is on a center line of the at least two magnet-insert holes.

* * * * *